Feb. 12, 1924. Re. 15,757

D. L. FINE

GARMENT

Original Filed Nov. 28, 1917 2 Sheets-Sheet 1

Inventor:
David L. Fine,
by Walter E. Lombard,
Atty.

Feb. 12 , 1924. Re. 15,757

D. L. FINE

GARMENT

Original Filed Nov. 28 , 1917 2 Sheets-Sheet 2

Inventor:
David L. Fine,
by Walter E. Lombard,
Atty.

Reissued Feb. 12, 1924. Re. 15,757

UNITED STATES PATENT OFFICE.

DAVID L. FINE, OF NEWTON, MASSACHUSETTS.

GARMENT.

Original No. 1,426,973, dated August 22, 1922, Serial No. 204,446, filed November 28, 1917. Application for reissue filed November 9, 1922. Serial No. 599,948.

*To all whom it may concern:*

Be it known that I, DAVID L. FINE, a citizen of the United States, and resident of Newton, in the county of Middlesex and State of Massachusetts, formerly of Dorchester, Mass., have invented a new and useful Garment, of which the following is a specification.

This invention relates to a garment, and pertains more particularly to a body covering, for the lower portions of the body, such as underskirts, petticoats, bloomers, knickerbockers, drawers, or the like. The invention has for its special object and application a proper and efficient means for supporting a divided, bifurcated or separated garment or skirt at the point of suspension along the waist-line of the body, and leaving the upper rear portion thereof open to be covered by a drop-flap preferably formed integral with the lower rear portion of the garment, and detachably secured to the front portion by fastening devices at the sides of the waist.

In order to illustrate my invention, I have shown in the accompanying drawing but a single embodiment thereof, wherein.

Figure 1:
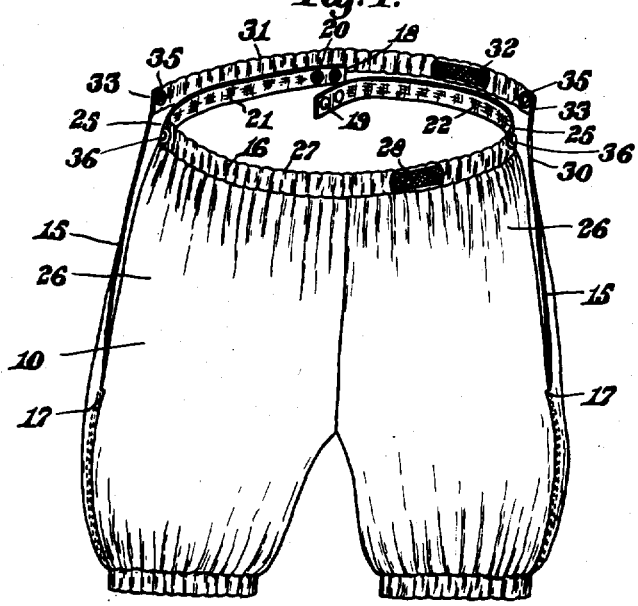
Fig. 1 is a perspective view of a body garment herein consisting of a pair of bloomers with the invention applied thereto.

The terms employed herein are used in the generic and descriptive sense to indicate elements, and are not therefore specifically or primarily intended as terms of limitation.

In the drawings 10 in its entirety designates a body covering for the lower portions of the body. Herein, for convenience, the said covering is shown as a pair of ladies' bloomers, knickerbockers or the like, having enclosures for the legs of the wearer, but for all practical purposes the covering may be an underskirt, drawers or such other articles of apparel as are adapted to be supported, suspended or hung from the waist-line of the wearer. Such garments may be divided or separated at one or more points along the waist-band to permit of the passage of the body therethrough and to provide a flap or drop-flap, these divisions or plackets being preferably at the sides or hip portions.

After the garment has been fastened to the body by the usual types of waist-bands, it frequently becomes necessary to unfasten the entire supporting band to permit displacement of a portion of the garment. This is especially the case where the garment is of the closed or bifurcated type. That is, for example, it separately and completely encloses each leg and the lower part of the body as in the case of bloomers, knickerbockers, trousers, drawers and the like.

Figure 2:
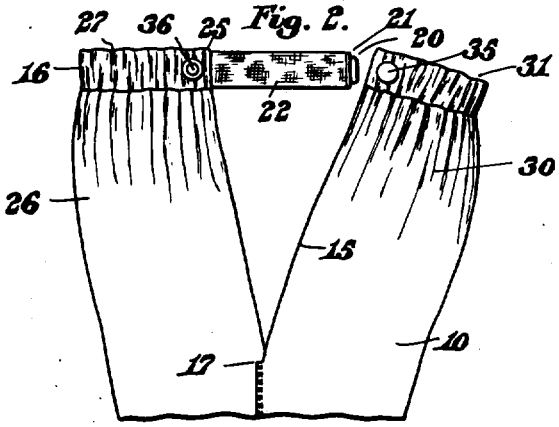
Fig. 2 is a side elevation of the upper portion of the said bloomers.

The bloomers illustrated by Figs. 1 and 2 are formed of a fore part and a rear part parted at 15 along each side from the waist-band 16 to point just below or preferably below the hips at 17 said fore part and rear part being permanently secured together from said point to the bottom of the garment. Herein the waist-band consists of a body or waist encircling portion shown in the various figures and adapted to be joined or fastened together at 18 by means of the stud and socket clasps 19 and 20. As illustrated, the said junction is preferably at the middle of the back; thus, in Figs. 1 and 2, providing said band 16 with two extensions in the form of straps 21 and 22, and in Figs. 3 and 4 with cloth extensions 23 and 24 projecting from each side 25 of the forepart 26 of the garment to said middle point. The said junction, however, may be at either side 25, thus providing for but one long strap or extension adapted to fasten by means of said clasps to the forepart 26 at the side opposite the permanent junction of the strap with said body. That is, the element forming the encircling portion about the abdomen, may be formed integral with the garment or may pass through a hem or beading 27 formed for that purpose. The strap extensions 21, 22 and the cloth extensions 23, 24 are entirely above the buttocks of the wearer, which are covered by no portion of the forepart 26, the rear of the forepart 26 being entirely open above the points 17 and between the side edges 25 of the forepart 26.

Referring to Figs. 1 and 2, the waist-band 16 is in the form of a hem or beading 27 enclosing the abdominal strap or band 28, preferably of an elastic or yielding nature of less length than the beading 27 when extended and secured to said waist band 16 only at its opposite ends. Therefore, when the abdominal band 28 is in the normal or retracted condition, the beading 27 is shirred, gathered or tucked to conform to the said normal length or condition of said abdominal band 28. The said straps 21 and 22 may be non-elastic and joined permanently to the side edges 25 of the forepart 26 and to the said abdominal band 28. This makes the waist-band consisting of the straps 21 and 22, or the abdominal band 28, as a unit from which the forepart 26 of the garment is suspended or hung.

Thus it will be seen that when the studs 19 and sockets 20 are snapped together after placing the band about the waist or body, that there is a complete encircling waist-band supporting the said forepart 26 which does not require removal until the garment is taken off the body. Therefore, said forepart 26 always remains in its proper place and does not drop or displace when other portions of the garment other than said waist-band herein are unfastened for displacement.

For example, the top of the rear or flap or drop flap 30 extends upwardly from the points 17 with its upper edge along the waist-line when the forepart of the garment and straps 21 and 22 are fastened to the body. Said flap 30 is provided with any preferred type of waist-band. As illustrated, the same consists of a hem or beading 31 through which is an elastic band 32 or the like, the ends of which are secured to the sides 33 of said flaps by stitching or any other form of fastening. Said elastic band 32, when in the normal or retracted state, is shorter than the top length of said beading 31 when extended so as normally to maintain the beading in a gather or tucked condition, the same as in the case of the forepart beading 27.

At each side of said flap at the waist-line or the termination of the waist-band is a socket 35 adapted to engage the stud 36 at each side edge 25 of the forepart 26.

In Fig. 1 the said flap 30 is illustrated as unclasped from the forepart 26 so that the former may be lowered to a point below the hips when necessary, leaving said forepart 26 and waist-band or straps 21 and 22 encircling the body to support the said forepart. When it is desired, the flap 30 is raised and the respective sockets 35 are snapped onto the studs 36 to properly support said flap 30 and entirely enclose the body.

By employing an elastic strap 28 about the abdominal portion of the waist-band, there is provided an automatic yielding or adjustable feature co-operating with the said straps 21 and 22 to permit the entire supporting band to snugly fit the body. Likewise, the elastic strap 32 at the waist-band of the flap 30 provides an automatic yielding or adjustable feature enabling the said flap to snugly fit across the back of the body.

Figure 3:
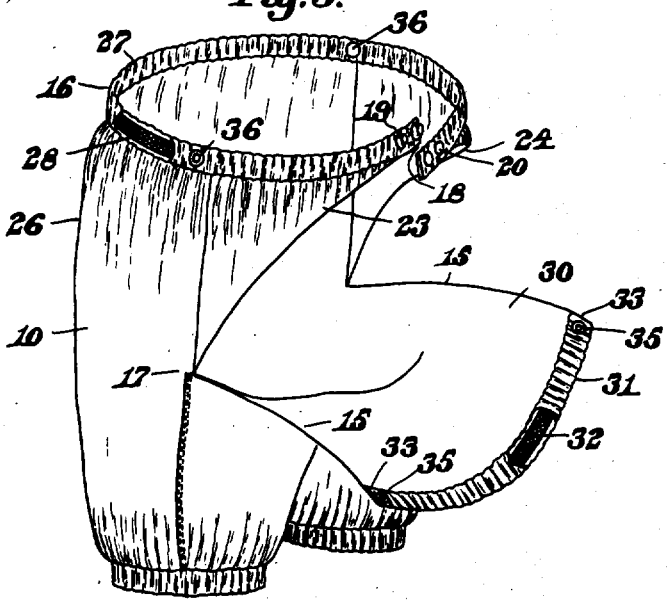
Fig. 3 is a perspective view of a modified form of said garment.
Figure 4:
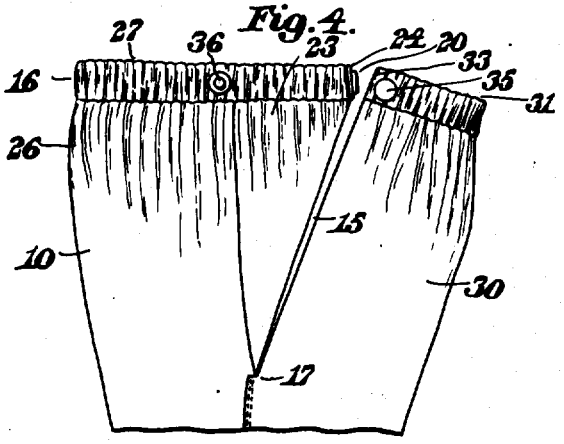
Fig. 4 is a side elevation of the upper portion of the garment shown in Fig. 3.

In Figs. 3 and 4, the body covering illustrated, is provided with the extensions 23 and 24 of any shape or design, projecting from the sides 25 to the middle portion of the back at 18. Preferably, said extensions are of triangular shape, the top portion of which may properly perform the functions of the straps 21 and 22. That is, the extensions may be unyielding, as in the case of said straps and joined to the forepart 26 along the parting 15. On the other hand, the beading 27 and strap 28 may be continued to the junction point 18 to form a continuous elastic supporting band for said forepart 26. The flap 30 is secured to the said forepart 26 at the sides 25 and in the same manner as in Figs. 1 and 2.

By the employment of my invention, improper or bungling replacement of an under garment of this class is eliminated, and all parts not necessary to remove or displace are not disturbed once the garment is in place on the body and an overskirt covers the same. That uncomfortable and unsightly bunching of the clothing is obviated and a garment of the utmost utility and convenience is provided.

I have described herein one embodiment of my invention, but it is to be understood that the latter is not essentially limited to the specific construction and organization of said embodiment, since the same may be varied without departing from the proper scope of the claims.

Having thus described my invention in detail, what I claim as new is:

1. In a waist supported garment, a body covering having the top portion thereof divided at the hip sections of the same to form a forepart and a drop-flap, said forepart being provided at the waistline thereof with an elastic band having the ends thereof permanently secured at the ends of said forepart with the intermediate parts of said forepart slidably supported on said elastic band to effect a gathering feature to said forepart, and a restraining means extending rearwardly beyond said forepart for engaging the same in supported relation about the waist of the wearer, and said drop-flap being also provided at the waistline thereof with an elastic band having the ends thereof permanently secured to the sides of said drop-flap with the intermediate portions of said drop-flap slidably supported on said last mentioned elastic band for effecting a gathering and self-contracting feature for the waistline of said drop-flap; and coacting fastening means provided at the sides of said forepart and said drop-flap at the waistline sections thereof, adapted to temporarily support said drop-flap in wearing relation with said forepart of said garment.

2. In a garment, a body covering divided at each side thereof from the top or waistline to a point below the hips to form a forepart and a drop-flap, said forepart being provided at the waistline thereof with an elastic band having the ends of said band permanently connected to the ends of said forepart with the intermediate section of said forepart slidably supported on said elastic band for effecting a self-gathering feature to said forepart, and said drop-flap being provided at the waistline thereof with an elastic band which is also permanently secured at the ends thereof with the sides of said drop-flap with the intermediate section of said drop-flap slidably supported on said elastic band to provide a self-gathering and self-contracting feature for the waistline of said drop-flap; a pair of straps secured to and extending from each side of said forepart adapted to be joined together to form an encircling member about the waist of the wearer to support the garment in wearing relation with the body; and coacting fastening means provided said forepart and said drop-flap at the upper points of division of same, adapted to temporarily secure said drop-flap in closed relation with said forepart.

3. In a waist supported garment, a body covering having its top portion divided at its sides or hip portions to form a forepart and a drop-flap, said forepart being provided with an elastic waistline part extending substantially from one to the other of said sides, non-elastic straps fixed on and extending rearward from the sides of said forepart and provided with means to attach their rear ends to one another, said drop-flap having its upper edge formed into an elastic waistline part extending substantially from one to the other of said sides, and attaching means at said sides to detachably secure these elastic waistline parts to one another so as to complete an endless elastic waistband around said non-elastic straps, substantially as shown, for the purpose specified.

Signed by me at 746 Old South Building, Boston, Massachusetts, this 3rd day of November, 1922.

DAVID L. FINE.

Witnesses:
WALTER E. LOMBARD,
NATHAN C. LOMBARD.